(12) United States Patent
Siu (10) Patent No.: US 9,774,459 B2
(45) Date of Patent: Sep. 26, 2017

(54) SECURITY SYSTEM AND METHOD USING WIRELESS ADAPTERS AND POE CAMERAS

(75) Inventor: Patrick Siu, Tyngsborough, MA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 570 days.

(21) Appl. No.: 13/530,863

(22) Filed: Jun. 22, 2012

(65) Prior Publication Data

US 2013/0342688 A1     Dec. 26, 2013

(51) Int. Cl.
*H04L 12/10*     (2006.01)
*H04N 7/18*     (2006.01)

(52) U.S. Cl.
CPC ................... *H04L 12/10* (2013.01)

(58) Field of Classification Search
CPC .... H04N 7/18; H04L 12/2818; H04L 12/2832
USPC ......................................... 348/143
See application file for complete search history.

(56) References Cited

U.S. PATENT DOCUMENTS

| | | | |
|---|---|---|---|
| 2007/0054618 A1 | 3/2007 | Lewis et al. | |
| 2008/0143611 A1* | 6/2008 | Wang | H01Q 1/243 343/702 |
| 2010/0009576 A1* | 1/2010 | Schaffer | H01R 13/514 439/676 |
| 2011/0077793 A1 | 3/2011 | Hsieh et al. | |
| 2011/0096168 A1* | 4/2011 | Siann | H04N 7/183 348/158 |
| 2011/0096188 A1 | 4/2011 | Ishida | |
| 2011/0206088 A1* | 8/2011 | Binder | H04B 7/15542 375/136 |
| 2012/0317247 A1* | 12/2012 | Dattagupta | H04L 12/2807 709/220 |

FOREIGN PATENT DOCUMENTS

| | | |
|---|---|---|
| CN | 101529886 A | 9/2009 |
| CN | 102404558 A | 4/2012 |
| WO | 2008/054897 A1 | 5/2008 |

OTHER PUBLICATIONS

European Search Report received from the European Patent Office dated Nov. 11, 2013, for EP Application No. 13 17 3292.

(Continued)

*Primary Examiner* — Obafemi Sosanya
(74) *Attorney, Agent, or Firm* — HoustonHogle LLP (57) ABSTRACT

A wireless adapter and method for providing a wireless connection to at least one wired security device includes at least one combined data/power physical port to which the wired security device connects. A power supply module receives power from an external power source and a power injector provides power to the combined data/power physical port to thereby power the wired security device. In this way, the wireless adapter supplies both power and data connection at the same physical port/jack of the wired security devices, such as IP security cameras, via an interface cable from the wireless adapter. This configuration has advantages in lowering the manufacturing costs of the cameras and reducing installation costs. Furthermore, the same standard camera can be used for both standard wired connections and wireless connections.

17 Claims, 5 Drawing Sheets

(56) References Cited

OTHER PUBLICATIONS

Axis Communication "Setting Up an IP-Surveillance System Using Axis Network Cameras, Video Encoders and AXIS Camera Station Software", IP-Surveillance Design Guide, Jan. 1, 2008, 50 pages.
"JetBox 9562 4-Port Serial & 5-Port Vehicle PoE Routing Computer," Korenix Technology Co., Ltd., from http://www.korenixsecurity.com/products/surveillance-networking-computer/jetbox-9562, dated on Aug. 9, 2010 (archive.org), 7 pages.
"JetBox 9562 4-Port Serial & 5-Port Vehicle PoE Routing Computer," Korenix Technology Co., Ltd., Downloaded from http://www.korenixsecurity.com/products/surveillance-networking-computer/jetbox-9562 on Jul. 5, 2013, 7 pages.

* cited by examiner

SECURITY SYSTEM AND METHOD USING WIRELESS ADAPTERS AND POE CAMERAS

BACKGROUND OF THE INVENTION

Security network systems are often used for monitoring activities in and around residential and commercial buildings. Security networks typically include keypads or other access control devices, system controllers, a variety of intrusion sensors, security cameras, and network video recorders (NVRs) that connect to each other through a common wired network.

One type of security camera that is often used within security network systems is an internet protocol (IP) security camera. The IP security camera differs from closed circuit television cameras in that it can send and receive data via a network and utilizes the internet protocol address schema.

IP security cameras can be used to monitor buildings and rooms within buildings and can also be used to monitor public areas such as parks or public spaces in and around buildings. In some cases they are used to catch illegal activity. In other cases, they are used to monitor shopping patterns in a retail store or traffic levels on public roadways, or detect events that would require the intervention of emergency response personnel.

Power over Ethernet (PoE) wired security cameras are being introduced. PoE is a technology in which power is provided over Ethernet-type data cabling. This type of cabling is usually referred to a Category X (Cat x) type cable. For example, Cat 5 cables or higher would be used for higher data transmission speeds. Alternatively, Cat 3 cables or less are used for lower data transmission speeds. Such cameras are powered by DC current provided over two or more of the differential/twisted pairs of wires within the Cat x cable. PoE technology provides the advantage of powering a network or security device over the same data cable that connects the security device to the network.

Typically, PoE technology can be installed by one or two methods. One method involves running a cable from a PoE switch directly to the PoE security camera. A second method involves running a cable from a non-PoE switch to a PoE injector that is then connected by a cable to the PoE security camera. If the security camera does not support PoE, a PoE splitter can be used to split the power and data before connecting to the security camera.

It is often required that security systems provide wireless connectivity to remote security devices within the security network. One example of where it is useful includes security systems that have cameras outside a building in remote locations that are far from access to the wired portion of the security network. Also, wireless connectivity may be useful where many different security cameras are positioned in different rooms throughout a building.

The wireless connectivity is typically added to the wired security network by adding a wireless access point. Often these devices are referred to as WiFi access points. WiFi is a trademark of the Wi-Fi Alliance and refers to devices that utilize the IEEE 802.11 family of standards. The wireless connectivity is added to the security camera using one of two ways: 1) a separate wireless adapter; or 2) an integrated wireless adapter with the security device.

SUMMARY OF THE INVENTION

Providing integrated wireless capabilities into the cameras is problematic because it creates added costs. The integrated setup has required manufacturers to design new (or redesign) cameras with built-in wireless functionality while continuing to power each camera by a separate connection. Therefore, this means more R&D expenses along with increased manufacturing and inventory costs. Furthermore, the integrated camera will also require future support costs due to potential functional problems with the internal adapter.

Providing a separate wireless adapter for the cameras, for example, has advantages such as enabling a single adapter to support wireless connectivity for multiple cameras. Moreover, the same adapter could be used for other security devices on the network.

The problem is that using conventional wireless adapters, a separate power source for the camera is still required. This increases installation costs for each camera because each device needs to be connected upon installation. Connecting each device to a power source and to the adapter impacts the cost to deploy the device. Also, this increases manufacturing costs since each camera now requires a power jack and a data jack. Adding these jacks increases the overall manufacturing cost of the device.

The present invention concerns a wireless adapter that supplies both power and data connection at the same physical port/jack of the wired security devices, such as IP security cameras, via an interface cable from the wireless adapter. In a current embodiment, the wireless adapter provides data connectivity and power to the security cameras, for example, via PoE.

This has advantages in that the manufacturing costs of the cameras can be reduced significantly since there is less cabling when one physical jack is used for both power and data. Furthermore, the same standard camera can be used for both standard wired connections and wireless connections with this wireless adapter.

In general, according to one aspect, the invention features a wireless adapter for providing a wireless connection to at least one wired security device. The wireless adapter includes at least one combined data/power physical port to which at least one wired security device connects, a power supply module that receives power from an external power source, a power injector that receives power from the power supply module and provides power to the combined data/power physical port, an adapter controller that maintains a wired data connection to the wired security device via the combined data/power physical port, and a wireless transceiver that maintains a wireless data connection to a remote wireless access point using at least one antenna.

In general, according to another aspect, the invention features a security network system including a remote wired security device, a wireless adapter that powers and has a wired data connection with the remote wired security device via an interface cable, a security network controller that controls and receives data from the remote wired security device, and a wireless access point for supporting a wireless data connection to the wireless adapter.

In general, according to still another aspect, the invention features a method of connecting a remote security device to a security network including providing a wired security device that is powered via combined data/power physical port, providing a wireless adapter, installing wired security device at a remote location, installing the wireless adapter and wiring adapter to an external power source, connecting the wired security device to the wireless adapter with an interface cable via the combined data/power physical port of the security device, using the adapter to establish a wireless connection to the security network, transferring power from the wireless adapter to the wired security device via the interface cable, and then transferring data from the wired security device to the wireless adapter over the interface cable and then from the wireless adapter over the wireless connection to the security network.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
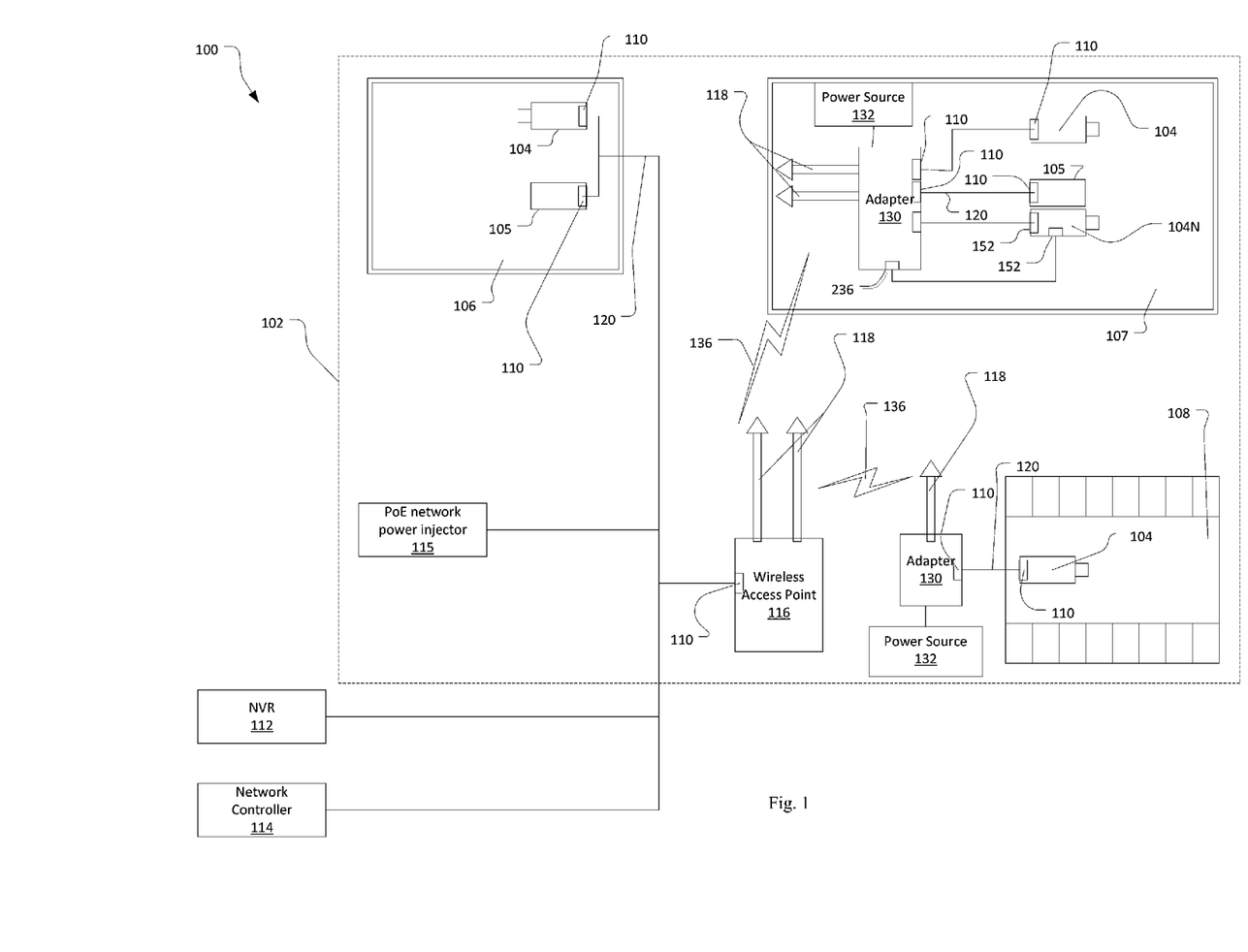
FIG. 1 is a block diagram of a security network system showing the relationship between various components such as a wireless adapter, IP security cameras, and access points.

FIG. 1 shows a security network system 100 and wireless adapter 130 that have been constructed according to the principles of the present invention.

In one example, the security network system 100 is deployed at an installation 102 such as an office complex, a single building or a larger institution. The installation 102 includes remote wired security devices 104, 105 distributed throughout the installation 102. For example, two security devices 104, 105 are located inside a building 106. Another security device 104 is positioned outside in a parking lot area 108. Three security devices 104, 105 are located inside another building 107.

Some of the wired security devices are security cameras and preferably IP security cameras 104. Each of these IP security cameras 104 is positioned to observe and record images from an area under observation. These IP security cameras 104 preferably each include a combined data/power physical port 110.

In the security network system 100, other wired security devices 105 are also usually included. These other devices typically fall into one of the following categories: keypads, other access control devices, and intrusion sensors. Preferably, for ease of installation, these other security devices 105 also may typically each have a combined data/power physical port 110.

The combined data/power physical port 110 of each of the wired security devices 104, 105 is preferably a physical port that implements Power over Ethernet or PoE technology. This is a system that enables the transmission of electrical power along with data over Ethernet cables. Generally, Cat x cabling such as Cat 5 or 6 cabling is used, although Cat 3 can be used in some implementations. The PoE is outlined in IEEE 802.3af-2003 PoE standard. An updated IEEE 802.3at-2009 PoE standard, also known as PoE+ or PoE plus, provides for greater network device power consumption.

The overall security network system 100 is typically controlled by a security network controller 114. Typically, these controllers perform device authentication for the security network system 100. Specifically, they confirm that each of the devices on the system 100 is a valid authenticated device and is operating properly. The controller 114 preferably further includes operator interfaces that provide for the display of the video images generated by each of the security cameras 104, compile and display information from the other security devices 105, and further control physical access points such as doors or gates at the installation 102.

A network video recorder (NVR) functions as a centralized video data storage location for the image data generated by each of the IP security cameras 104. In some examples, the NVR stores all of the video data transmitted from the security cameras 104. In other examples, it only stores data that are associated with specific events. Often the NVR further indexes and possibly analyzes the video for specific events of interest such as security breaches.

In the wired portion of the network, network cabling 120 connects the network security devices 104, 105 to the other security network components such as the NVR 112 and the network controller 114. Power is injected onto this cabling sometimes using a separate PoE network power injector 115. This device is responsible for energizing one or more twisted pairs of the Cat x network cabling 120 with the DC power that is used to power the PoE devices via their combined data/power physical ports 110.

The connection of wired security devices 104, 105 into the network security system 100 is achieved via wireless data connections. In the illustrated example, this is achieved using wireless access points 116. These access points 116 are connected to the wired portion of the security system 100 and specifically to the network cabling 120 that also usually connects devices such as the NVR 112, controller 114, and at least some of the wired security devices 104, 105.

The wireless access points 116 establish the wireless data connections 136 to one or more wireless adapters 130. To establish wireless data connections 136, both the wireless access point 116 and the adapters 130 have their own antennas 118. In some examples, these antennas are internal or external to the corresponding access points 116 or adapters 130. In some examples, multiple-input and multiple-output (MIMO) antenna arrays are used.

Generally, the two main types of wireless adapters 130 include WiFi and cellular. WiFi adapters provide wireless connectivity 136 to a wired portion of the system 100 via the access point 116 and implement one or more of the IEEE 802.11 b/g/n/ac protocols. Cellular or broadband cellular adapters, also referred to as "air cards," "broadband adapters," or "broadband cards," provide the same wireless data connection 136 using a third party cellular network that functions as the access point 116. Current and future technologies here include 3G, 4G(LTE), and 5G.

According to further aspects of the invention, the wireless adapters 130 each include one or more than one combined data/power physical ports 110. As described previously, these ports are preferably PoE ports, which in the case of the adapters 130, supply power to wired security devices 104, 105 that are connected to these ports 110 of the adapters 130.

This configuration requires the wireless adapters 130 to be both the wireless data connection point and also the power source for the wired security devices 104, 105. As a result, each of the adapters 130 is connected to a separate external power source 132. Often, this power source is the standard 120 Volt AC power that is available in the building. In other examples, power may be supplied through a dedicated security system DC power bus.

Each of the adapters 130 is wired to the wired security devices 104, 105 that it supports. For example, in building 107, the wireless adapter 130 is connected to two IP security cameras 104, 104N and a wired security device 105. This connection is typically made using Cat x cabling 120 that connects the combined data/power physical ports 110 of the adapter 130 to the combined data/power physical ports 110 on IP security camera 104 along with the wired security device 105. It should be noted that, according to the invention, the combined data/power physical ports 110 of the adapter 130 function as the source of the power that is transmitted to the wired security devices 104, 105 via their respective combined data/power physical ports 110.

In one embodiment, the wireless adapter 130 further has a DC power port 236 to power non PoE security devices such as IP security camera 104N. Specifically, IP security camera 104N includes a standard data port 152 and a separate power input port 154 that receives power from the power output port 236 of the adapter 130.

In the other example of the wireless deployment of a wired security camera, the security camera is positioned to observe a parking lot 108. It is connected to a dedicated wireless adapter 130 via respective combined data/power physical ports 110. This wireless adapter 130 also establishes its wireless data connection 136 to the wireless access point 116.

Figure 2A:
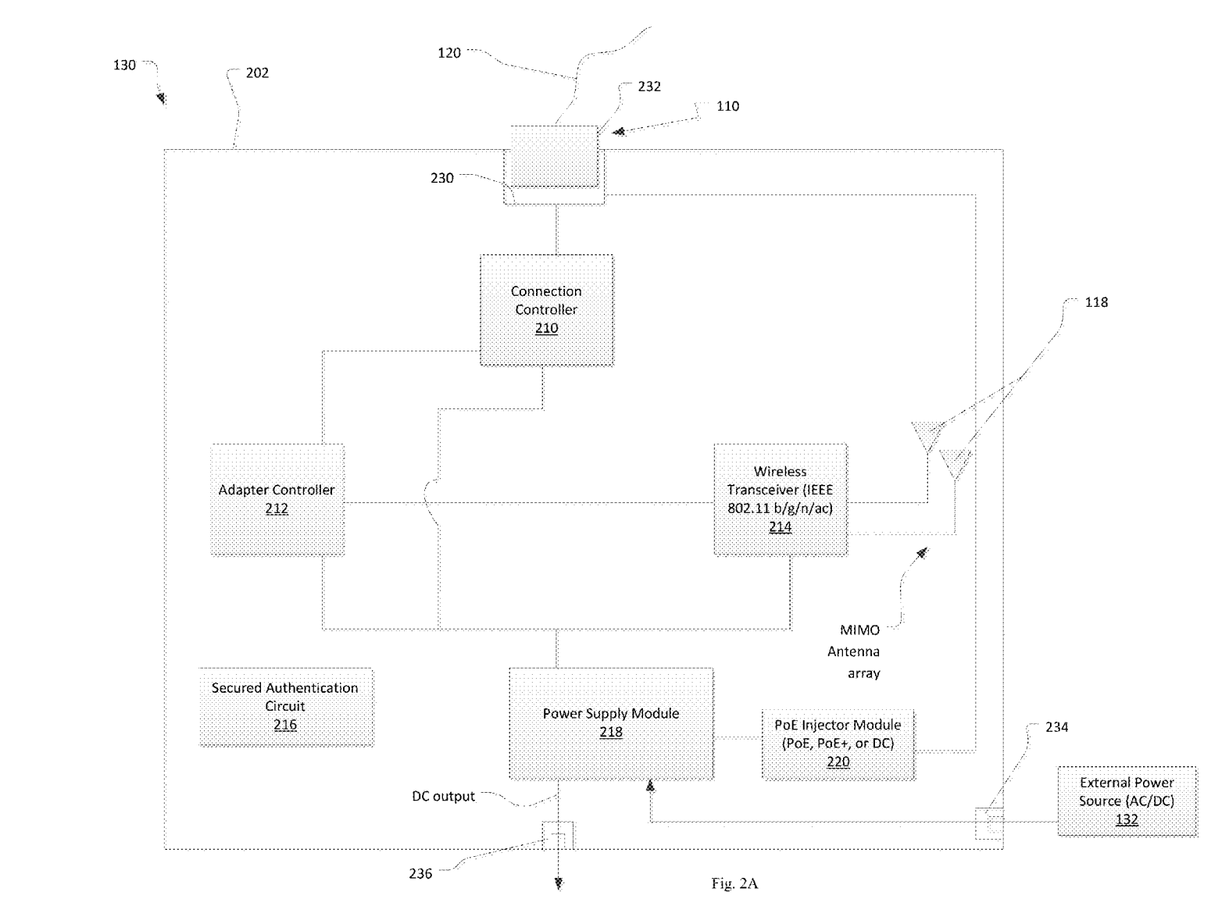
FIG. 2A is a block diagram of an embodiment of the wireless adapter providing PoE to wired security devices according to the present invention.

FIG. 2A shows the internal architecture of a wireless adapter 130 according to one embodiment. The adapter 130 includes an outer housing 202, which may be designed for deployment within the building or outside. In the illustrated example, the antennas 118 are located within the outer housing 202.

In the illustrated embodiment, there is one combined data/power physical port 110. When utilizing PoE, the physical port 110 is typically implemented using a RJ-45 jack 230 that is installed in the outer housing 202. The network cabling 120, or interface cable, connects to the RJ-45 jack 230 via and RJ-45 plug 232.

A data connection controller 210 manages the data communication at the physical layer. The data transmission to and from the port 110 is passed to the adapter controller 212. A wireless transceiver 214 establishes the wireless data connection 136 via the antennas 118. In this way, image data from an IP security camera 104 are received at the adapter 130 and then transmitted to the controller 114 and/or NVR 112 via the access point 116.

In the illustrated example, a secured authentication circuit 216 is also provided. It enables the authentication of the adapter 130 to the system controller 114 and preferably also helps manage the authentication of any of the wired security devices 104, 105 that are connected to the wireless adapter 130.

An internal power supply module 218 generates the power at the voltages required by the various circuits and chips within the wireless adapter 130. In the illustrated example, the power supply module 218 provides power to the adapter controller 212, wireless transceiver 214, and connection controller 210. The power supply module 218 receives AC or DC input power via an input power port 234 that is wired to the external power source 132.

Power from the internal power supply module 218 is also supplied to the combined data/power physical port 110 and specifically the RJ-45 jack 230 via a PoE injector module 220. Often, this module 220 provides the power at the current and voltage specified by the PoE standard. It also handles circuit and voltage overload conditions and short-circuit conditions.

In one embodiment, the access point 130 also has a DC power output port 236. This power output port is supplied with power from the power supply module 218. It is used for some legacy devices that may require power via a separate power port and not a combined power/data port 110.

Figure 2B:
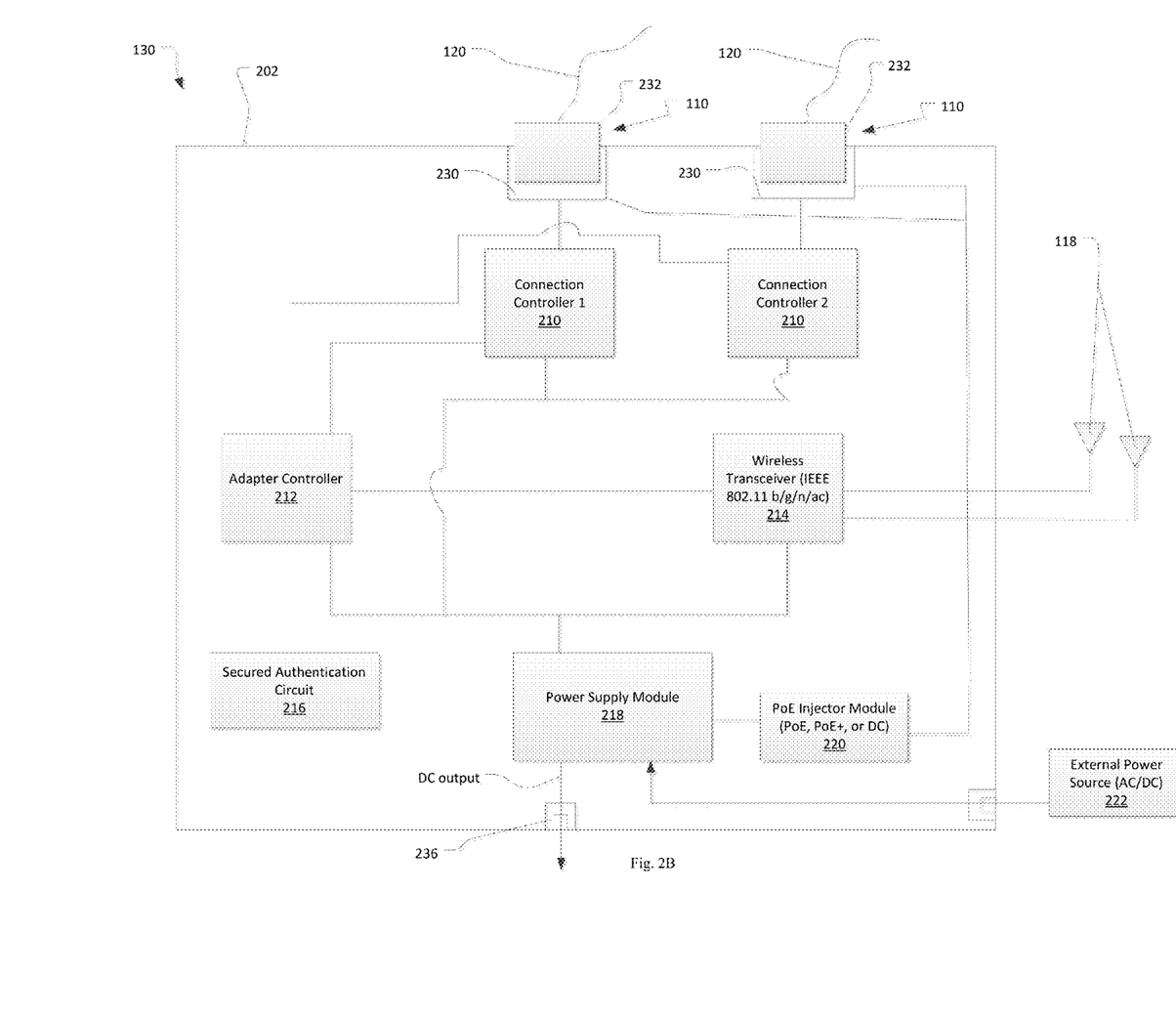
FIG. 2B is a block diagram of another embodiment of the wireless adapter providing PoE to wired security devices.

FIG. 2B shows an alternative embodiment of the wireless adapter 130. It is generally similar to the previously described adapter. However, in this example, two combined data/power physical ports 110 are provided. Each of these is implemented as an RJ-45 jack 230 that is installed on the adapter housing 202.

A connection controller 210 is provided for each of the combined data/power physical ports 110. Likewise, the POE injector module 220 provides the power that is injected into the cabling 120 to power the security devices 104, 105 via the RJ-45 jacks 230 and the RJ-45 plugs 232 of the cabling 120.

Figure 3:
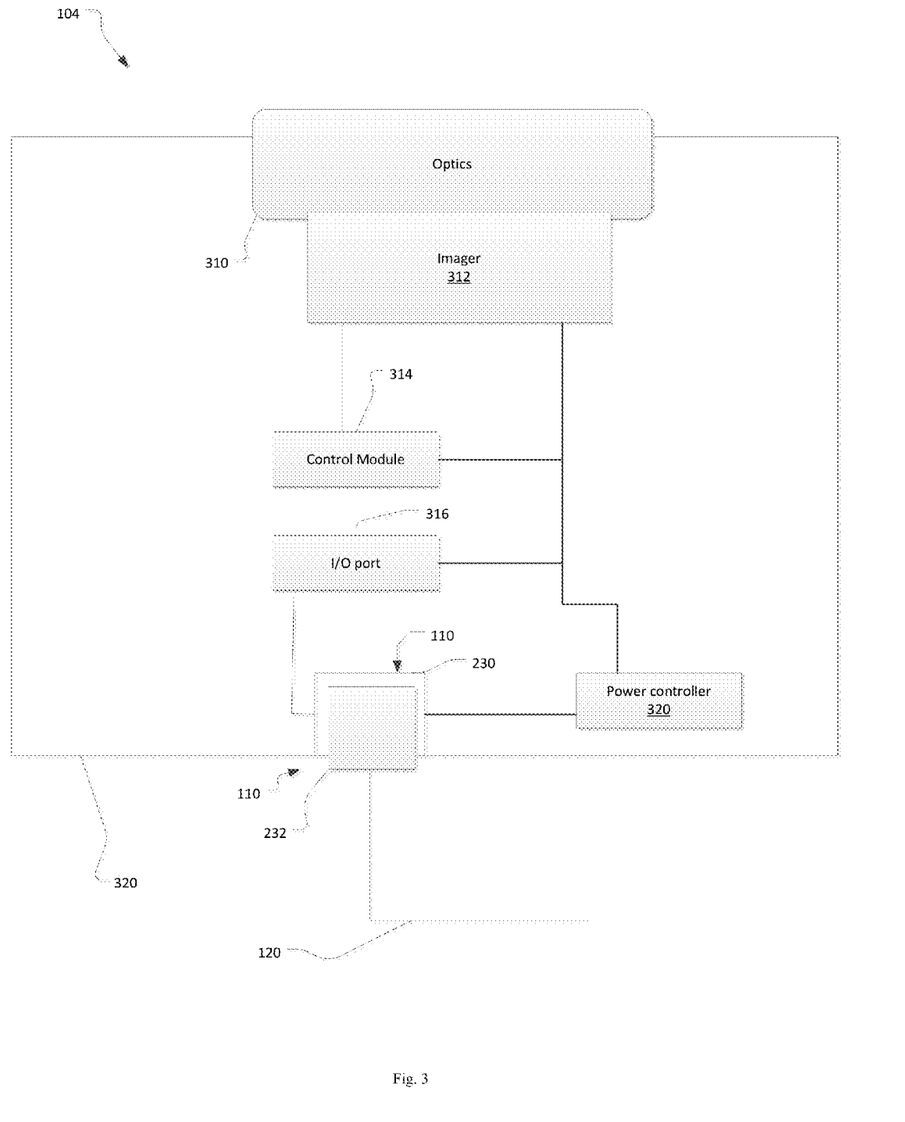
FIG. 3 is a block diagram of a conventional IP security camera.

FIG. 3 illustrates a conventional IP security camera that is powered using PoE and is compatible with the present system. As is standard, it includes optics 310 that form an image of the area under observation on the imager chip 312. A control module 314 receives the image data from the imager chip 312. These image data are then transferred to an input/output port controller 316 that transmits the data over the interface cable 120 via the combined data/power physical port 110. In the example of the IP security camera 104, the combined data/power physical port 110 is the power source for the camera 104. That is, a camera power controller 320 receives power from the port 110 and specifically RJ-45 jack 230 and then provides power to the chips and circuits within the camera 104 such as the port controller 316, control module 314, and imager chip 312.

When using the PoE standard, the combined data/power physical port 110 is implemented as a RJ-45 jack 230 that is installed in the IP security camera housing 320. An RJ-45 plug 232 of the interface cable 120 then connects into this jack 230.

Using this system, i.e., supplying power to IP security cameras 104 that connect to a security network system 100 via a wireless data connection 136 using wireless adapters 130, has a number of advantages. First, the same IP security cameras 104 can be used for both the wired portion of the security system 100 along with the wireless portion. This reduces logistical issues since only a single or fewer types of security cameras must be stocked by the security system vendor. Moreover, the IP security cameras 104 can be cheaper to manufacture. One significant cost in manufacture is the number of physical ports that must be provided on the camera housing 320. By using the present system, only a single combined data/power physical port 110 is required.

Moreover, installation costs are also reduced. The major cost of installation is running the wires between the various components of the security system 100. Using the current system, only a single wire, interface cable 120, needs to be run between the wireless adapter 130 and the wired security device 104, 105 since this single cable provides both power and data.

In some ways, the complexity of the wireless adapter 130 is now greater since it must perform two roles of providing the wireless data connection 136 for the network security devices 104, 105 along with providing power to those devices. On the other hand, a separate power source for the wireless adapter 130 was required in any event. And, the cost of adding the PoE capability to the wireless adapter 130 is relatively small.

Figure 4:
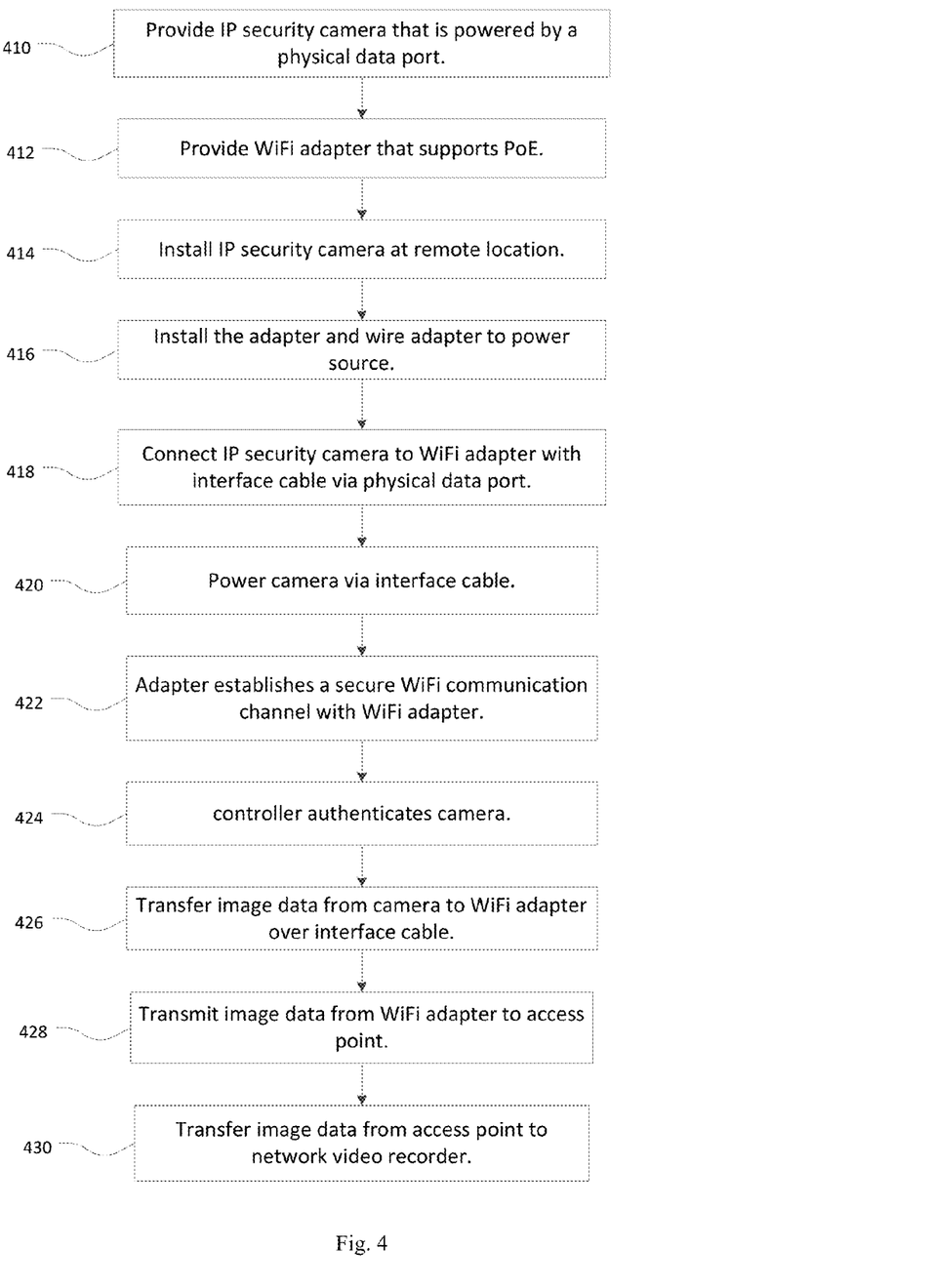
FIG. 4 is a flowchart illustrating method for deploying security devices in a wireless portion of a security network system.

FIG. 4 illustrates a method for deploying and using a security system with a wireless portion according to the present invention.

In step 410, IP security cameras 104 are provided that are powered by a combined data/power physical port. Wi-Fi adapters 130 are then utilized in step 412 that supply power via a combined data/power physical port such as PoE, for example.

In step 414, the IP security cameras 104 are installed at the desired location. This is typically a remote location that would be too expensive to provide a wired data connection, thus necessitating a wireless data connection 136.

In step 416, the wireless adapter 130 is then installed typically near the IP security camera 104 and connected to the external power source 132. In step 418, the IP security camera 104 is then connected to the wireless adapter 130 via the interface cable 120 that extends between the combined data/power physical ports of each of the devices. In step 420, the camera is then powered via this interface cable 120 by the adapter 130.

In step 422, the wireless adapter 130 establishes a wireless data connection 136 with an access point 116 on the wired portion of the security system 100. Preferably, this data connection is a secure Wi-Fi communication channel.

In one embodiment, the controller 114 or possibly the NVR 112 authenticates one or both of the adapter 130 or IP security camera/device 104/105 on the security system 100.

During operation, image data are transferred from the camera 104 to the wireless adapter 130 over the interface cable 120 in step 426. These image data are then transferred in step 428 from the Wi-Fi adapter 130 to the access point 116. The image data are then typically recorded in the NVR 112 and/or made available to an operator of the network 100 by the security network controller 114.

While this invention has been particularly shown and described with references to preferred embodiments thereof, it will be understood by those skilled in the art that various changes in form and details may be made therein without departing from the scope of the invention encompassed by the appended claims.

What is claimed is:

1. A security network system for a building having a wireless connection to two or more wired security cameras, the system comprising:
    a wired security network in a building;
    a wireless adapter associated with the building, the wireless adapter including:
        two or more combined data/power physical ports to which the two or more wired security cameras connect via respective interface cables;
        a power supply module that receives power from an external power source;
        a power injector module that receives power from the power supply module and provides power to the two or more combined data/power physical ports;
        an adapter controller that maintains wired data connections to the two or more wired security cameras via the combined data/power physical ports; and
        a wireless transceiver that maintains a WiFi wireless data connection using at least one antenna;
    a security network controller in the building that controls and receives data from the two or more wired security cameras via the wireless adapter and other wired security devices via the wired security network; and
    a wireless access point for the building and having an antenna for supporting the WiFi wireless data connection for the wired security cameras via the wireless adapter between the wireless transceiver of the wireless adapter and the wired security network and the security network controller on the wired security network.

2. The system of claim 1, wherein the wireless adapter further comprises plurality of antennas for maintaining the wireless data connection.

3. The system of claim 1, wherein the wireless adapter further comprises an adapter housing wherein the at least one antenna is enclosed within the adapter housing.

4. The system of claim 1, wherein the wireless adapter further comprises an adapter housing wherein the at least one antenna is disposed on or mounted to the adapter housing.

5. The system of claim 1, wherein the wireless adapter and the wireless access point each further comprises a multiple-input and multiple-output (MIMO) antenna array for maintaining the Wi-Fi wireless data connection.

6. The system of claim 1, wherein the combined data/power physical ports are power over Ethernet (PoE) ports.

7. The system of claim 1, wherein the external power source is AC.

8. The system of claim 1, wherein the wireless adapter further comprises a separate physical power port for providing power to security devices.

9. The system of claim 1, wherein the wireless connection uses one or more of the IEEE 802.11 b/g/n/ac protocols.

10. The system of claim 1, wherein the wireless connection is cellular network connection.

11. The system of claim 1, wherein the wireless adapter further comprises a secured authentication circuit for authenticating the two or more wired security cameras to the security network controller.

12. The system of claim 11, wherein the authentication circuit enables access for only authenticated security cameras.

13. A security network system comprising:
    two or more remote wired internet protocol (IP) security cameras;
    a wireless adapter that powers and has wired data connections with the two or more remote wired security cameras via respective interface cables which include RJ45 plugs using power over ethernet;
    a security network controller that controls and receives data from the two or more remote wired security cameras and other wired security devices via a wired security network; and
    a wireless access point for supporting the wireless data connection between the wireless adapter and the wired security network;
    a network video recorder connected to the wireless access point via the wired security network for receiving image data from the IP security cameras over the wireless data connection.

14. A method of connecting two or more remote security cameras associated with a building to a wired portion of a security network of the building, the method comprising:
    providing wired security cameras that are powered via combined data/power physical ports;

providing a wireless adapter;

installing the wired security cameras at remote locations;

installing the wireless adapter and wiring the wireless adapter to an external power source;

connecting the combined data/power physical ports of the wired security cameras to the wireless adapter with interface cables via combined data/power physical ports of the wireless adapter;

using the wireless adapter to establish a wireless WiFi data connection to the wired security network via a wireless access point for the building for supporting the WiFi wireless data connection for the wired security cameras between the wireless adapter and the wired security network;

transferring power from the wireless adapter to the wired security cameras via the interface cables; and transferring data from the wired security cameras to the wireless adapter over the interface cables and then from the wireless adapter over the wireless data connection to the wired portion of the security network via the wireless access point.

15. The method of claim 14, further comprising authenticating the wired security cameras before transferring data from the wired security cameras to the security network.

16. The method of claim 15, wherein the data transferred are image data.

17. The method of claim 16, further comprising transferring the image data from the security network to a network video recorder.

* * * * *